United States Patent
Rai et al.

(10) Patent No.: US 11,393,022 B1
(45) Date of Patent: Jul. 19, 2022

(54) SYSTEMS AND METHODS FOR INCENTIVIZING SAVING

(71) Applicant: United Services Automobile Association (USAA), San Antonio, TX (US)

(72) Inventors: Yogen Rai, Plano, TX (US); Rachel Elizabeth Csabi, Frisco, TX (US); Yan Pei, Frisco, TX (US)

(73) Assignee: UNITED SERVICES AUTOMOBILE ASSOCIATION (USAA), San Antonio, TX (US)

( * ) Notice: Subject to any disclaimer, the term of this patent is extended or adjusted under 35 U.S.C. 154(b) by 0 days.

(21) Appl. No.: 17/129,227

(22) Filed: Dec. 21, 2020

Related U.S. Application Data (60) Provisional application No. 62/955,113, filed on Dec. 30, 2019.

(51) Int. Cl.
  *G06Q 40/02* (2012.01)
  *G06Q 40/06* (2012.01)
  *G06N 20/00* (2019.01)

(52) U.S. Cl.
  CPC ........... *G06Q 40/02* (2013.01); *G06N 20/00* (2019.01); *G06Q 40/06* (2013.01)

(58) Field of Classification Search
  None
  See application file for complete search history.

(56) References Cited

U.S. PATENT DOCUMENTS

| | | | | |
|---|---|---|---|---|
| 8,086,507 | B1* | 12/2011 | Alder | G06Q 20/108 705/30 |
| 10,636,085 | B1* | 4/2020 | Lovett | G06F 3/04842 |
| 11,164,265 | B1* | 11/2021 | Chuprevich | G06Q 40/12 |
| 2008/0235121 | A1* | 9/2008 | Gonen | G06Q 40/00 705/35 |
| 2009/0149106 | A1* | 6/2009 | D'Alleva | A63H 3/003 446/8 |
| 2014/0297348 | A1* | 10/2014 | Ellis | G06Q 10/063114 705/7.15 |
| 2015/0142689 | A1* | 5/2015 | Squires | G01C 22/00 705/329 |
| 2020/0242606 | A1* | 7/2020 | Logan | G06Q 20/1085 |

FOREIGN PATENT DOCUMENTS

WO WO-2019200350 A1 * 10/2019

OTHER PUBLICATIONS

Chafin, 3 Awesome Apps to Help Gamify Family Chores, Feb. 18, 2020, retrieved from lifesavvy.com from https://www.lifesavvy.com/12266/3-awesome-apps-to-help-gamify-family-chores/ (Year: 2020).*

* cited by examiner

*Primary Examiner* — Gregory S Cunningham, II
(74) *Attorney, Agent, or Firm* — Fletcher Yoder, P.C.

(57) ABSTRACT

A system may include a processor that may receive an indication of an amount of funds deposited into an account, convert the amount of funds into a number of tokens using a multiplier, and generate a visualization representative of a growth rate of the number of tokens over a period of based on an interest rate. The interest rate may be defined by a user with supervisor authority over the account. The processor may then display the visualization via an electronic display and periodically transfer an additional amount of funds from an additional account associated with the user to the account in response to the amount of funds remaining in the account after a period of time.

20 Claims, 3 Drawing Sheets

FIG. 5 ately spend
SYSTEMS AND METHODS FOR INCENTIVIZING SAVING

CROSS-REFERENCE TO RELATED APPLICATION

The present disclosure is related to, and claims priority to, U.S. Provisional Patent Application Ser. No. 62/955,113, titled "SYSTEMS AND METHODS FOR INCENTIVIZING SAVING," which was filed on Dec. 30, 2019, and which is herein incorporated by reference in its entirety for all purposes.

BACKGROUND

The present disclosure relates generally to systems and methods for incentivizing saving. More specifically, the present disclosure relates to systems and methods for tracking deposits and implementing a savings system that enables users to leverage future tasks for deposits.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a system may include a processor that may receive an indication of an amount of funds deposited into an account, convert the amount of funds into a number of tokens using a multiplier, and generate a visualization representative of a growth rate of the number of tokens over a period of based on an interest rate. The interest rate may be defined by a user with supervisor authority over the account. The processor may then display the visualization via an electronic display and periodically transfer an additional amount of funds from an additional account associated with the user to the account in response to the amount of funds remaining in the account after a period of time.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. One or more specific embodiments of the present embodiments described herein will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Minors (e.g., children) tend to utilize relatively short-term planning relating to money. Specifically, when they receive money for doing chores (e.g., tasks), receiving birthday gifts, and the like, they tend to want to immediately spend the money on goods (e.g., toys, candy) or other items that they want at that moment. With this in mind, it may be beneficial to provide a system that children, minors, and even adults may use that would help incentivize them into learning about and appreciating the value of investing money. As such, in certain embodiments, when an individual deposits money into an account, a savings system may convert the currency into a token or some other placeholder object to help the individual visualize or appreciate the value of the deposited money. In some embodiments, the deposited money may be converted to the tokens using a multiplier (e.g., 10, 100, 100) to exaggerate the value of the deposited money to help the individual consider the deposited value as being more valuable than the individual may initially give the currency. In some embodiments, the deposited currency may be exchanged for one or more physical tokens with values printed thereon.

In some cases, a bank or other suitable entity may encourage saving practices by allowing the individual to return to the bank to exchange the tokens for additional tokens to represent the growth of the tokens due to interest. Indeed, the interest rate may be inflated to a value (e.g., 50%, 70%) to help the individual realize gain more quickly, as compared to current interest rates provided by banks.

With the foregoing in mind, in certain embodiments, an application could be used to track the deposited money. For example, virtual tokens displayed by the application could directly relate to the deposited money. The application could be used to teach the individual about banking and investing in a gamified manner. For example, the application could facilitate interaction with partner websites (e.g., game applications, stores), where the individual could ultimately spend the deposited money. In these situations, the application may include monitors and limits that may allow another individual to control the access to the sites and the deposited money to a certain extent. For example, a minor child might be not allowed to spend more than a threshold amount of funds over a particular time period. In addition, the application could request parent or other adult approval via the application prior to allowing the minor child to execute a transaction.

In addition, servers or computing systems that control the visualizations presented on the website may modify the costs for each of the products listed on the website based on the tokens for the individual's account or scale value of tokens. That is, the token costs for each product may be modified from a raw value based on the scale factor in which the individual that is accessing the website uses. In some embodiments, the scale factor may be sent to the server to allow the server to update the presented website to correspond to each individual's scale factor and thus provide an improved user experience that allows users to associate their token balances with purchase prices. The server controlling the presentation of the website may modify the graphics of products or product prices that exceed the current token balance of the user. That is, the server may present the products with a different color (e.g., grey) or some other visualization to indicate that the product exceeds the balance of the tokens for the user.

To modify the token costs for various products, the server may receive a token scale factor from a respective application that access the corresponding website. That is, the server may receive metadata that includes a scale factor for the server to use to modify the website to include visually perceptible token values that correspond to the user's token's scale factor. Indeed, in some embodiments, the tokens may be designated using different names provided by the user. The metadata may include naming convention data as well. In this way, different users accessing the website may have a similar user experience with custom token values for corresponding products, thereby allowing the server to construct a webpage that is suitable for each individual user. As a result, the server may be able to present token values for its products in a consistent manner for any user.

In some embodiments, the particular token may have an identification tag (e.g., number) that is stored in a bank's records and directly corresponds to the deposited money. In addition, the application could provide an investment scale that is much more exaggerated than the relative time value of money. For example, the virtual tokens could increase at a much more exponential manner to give the minor child the impression that the investment is becoming even more beneficial than it may actually be in true value.

In addition to the embodiments described above, the application may also be used to distribute allowance by assigning tasks (e.g., chores) to provide insight into receiving regular income in exchange for worked performed. That is, for example, a child in a household could pick a task to complete via the application. The parents may then receive a notification via the application indicating that the task is completed. Upon approval from the parent, funds (e.g., real currency, virtual currency) may be transferred to the child's account. The application may generate a visualization that represents the current balance of the account, projected growth of the funds in view of the specified interest rate, and the like. In certain embodiments, the application may allow children to borrow against future tasks to be performed, and interest would be assessed, thereby teaching the children about loans. Each of the embodiments described above will be detailed below with reference to FIGS. 1-5.

Figure 1:
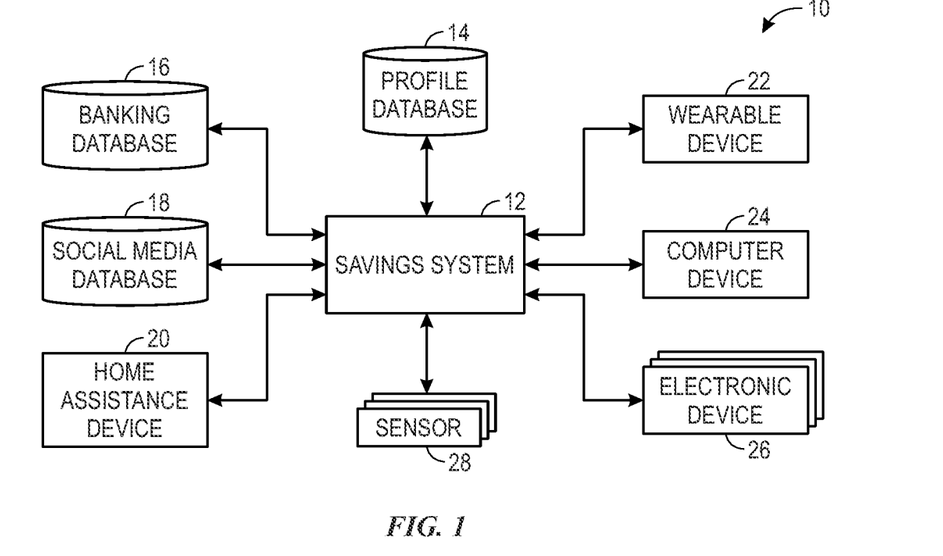
FIG. 1 a block diagram of a savings network, in accordance with embodiments described herein.

By way of introduction, FIG. 1 illustrates a block diagram of a savings network 10 that illustrates an example of data provided to a savings system 12, such that the savings system 12 may interact with other data sources to track deposits, growth of deposits, performance of tasks, control electronic devices, and the like. Although the savings system 12 illustrates that it may be connected to a certain number of data sources, it should be noted that, in other embodiments, the savings system 12 may include a number of additional sources or fewer sources than illustrated.

Referring to FIG. 1, in one embodiment, the savings network 10 may include the savings system 12, which may receive data regarding a deposit received at a bank, with an individual (e.g., parent), or the like. Using this data, the savings system 12 may generate visualizations to help a user of the savings system 12 track the status of user's funds. In some embodiments, the savings system 12 may generate a profile, which may digitally represent information related to the user and parameters in which the user's funds may be tracked, may grow, may be leveraged, and the like. By way of example, the profile for the user may include data related to income for the user by way of allowance, tasks performed, and the like. The profile may be stored in a profile database 14 for retrieval by the savings system 12 or other suitable systems to perform embodiments described herein.

In one embodiment, the savings system 12 may be any suitable computing device capable of receiving data, performing analysis on the data, and outputting data to a user, a display, a communication network or the like. Additional details regarding the savings system 12 will be described with reference to FIG. 2.

As mentioned above, the savings system 12 may receive data regarding the user. By way of example, the savings system 12 may access a banking database 16 that may include data related to the user and other users. The banking database 16 may include data related to income received by a user as deposits, direct deposits, regular-interval deposits, and the like. In some embodiments, each deposit may be associated with a source of the funds, an amount of the funds, and a description related to the funds. The banking database 16 may also include information related to withdrawals or payments made on the behalf of the user. In the same manner as the deposits, the withdrawal data may be characterized with a destination party for the funds, an amount of the withdrawal funds, a description related to the withdrawal funds, and the like.

In some embodiments, the savings network 10 may also include a social media database 18. The social media database 18 may store data scraped or acquired via social media websites or applications. The social media data may include information that characterize some of the interests of various users. By way of example, the social media database 18 may include data acquired from various social media sites such as Facebook®, Twitter®, Instagram®, TikTok®, and the like. In certain embodiments, the data in the social media database 18 may provide additional information regarding the social attributes of the users, such as whether certain tasks (e.g., chores) may have performed, interests associated with the users, and the like.

Additionally, the savings network 10 may also include other databases or sources of data that provide additional information regarding users who may seek financial instruments, such as loans. These additional data sources may include a number of databases or network-connected computers that include information regarding current events, financial market data, political events, environmental conditions, and the like. That is, since financial markets may be affected due to different political parties holding various political positions throughout the world, conflicts arising between different nations or within a particular nation, natural disasters occurring in certain areas, and the like, the additional databases may provide information related to these items through access to various websites and databases that may include general information that may be related to the financial sector.

In addition to the databases discussed above, the savings system 12 may receive data or output data to various devices that may be accessible via the savings network 10. For example, the savings network 10 may include a home assistant device 20, a wearable device 22, a computing device 24, other electronic devices 26 (e.g., headphones, wireless router), and the like. The home assistant device 20 may be a smart speaker that may include a microphone or sensors that receive audio data as spoke by users. The audio data may be interpreted by the home assistant device 20 to determine certain characteristics that describe the users who provided the audio data. The home assistant device 20 may thus determine, based on the audio data, an age of the user, a number of occupants living in a structure or house, demographic information regarding the user, and the like. In addition, the home assistant device 20 may receive an indication that a task has been performed via authenticated audio by an individual (e.g., parent) with authority to indicate that the task is complete. In some cases, the individuals with authority to perform these tasks and the training audio used to authenticate the voice of the individuals may be stored as part of the profile for the user in the profile database 14 or other suitable storage.

The wearable device 22 may include any suitable wearable smart device that may track movement of a user, send data to other network-connected devices, and the like. In some embodiments, the location of the wearable device 22 may be provided to the savings system 12 to enable the savings system 12 to determine areas or locations that the user wearing the wearable device 22 may have visited. In some embodiments, the data provided by the wearable device 22 may provide the savings system 12 with insight into whether the user performed a task. Indeed, the task may be associated with an exercise goal (e.g., minutes of exercise, number of steps) that may be tracked by the wearable device 22, which may forward the relevant data to the savings system 12.

The electronic device 26 may include other suitable electronic devices that may be used to verify that tasks are performed. For example, the electronic device 25 may include motion or proximity sensors that log activity of the user in a particular area. In addition, the electronic device 26 may include devices such as tablet computers, headphones, routers, gaming systems, and other devices that may be controlled via wired or wireless communications. In this way, the savings system 12 may control access or the functionality of the electronic devices in accordance with embodiments presented herein.

In addition to the components described above, the savings network 10 may include one or more sensors 28 that may track the user's presence or activities. The sensors 28 may include image sensors that track or record video data or image data of the user's activity. The sensors 28 may also include infrared sensors or other suitable sensors that may be used to receive data representative of a state of a physical space or object. As such, the data received from the sensors 28 may be utilized by the savings system 12 to determine whether tasks are performed, such that the savings system 12 may take additional actions.

The computing device 24 may include any suitable computing device, such as a general-purpose computer, a smart phone, a tablet device, and the like. The computing device 24 may perform similar operations as described as being performed by the savings system 12, the home assistant device 20, the wearable device 22. With the foregoing in mind, the savings system 12 may include any suitable computing device such as a general-purpose computer, a mobile-computing device, a tablet-computing device, a laptop-computing device, or the like. In certain embodiments, the savings system 12 may receive data from the various sources illustrated in FIG. 1 to perform the various embodiments described below.

Figure 2:
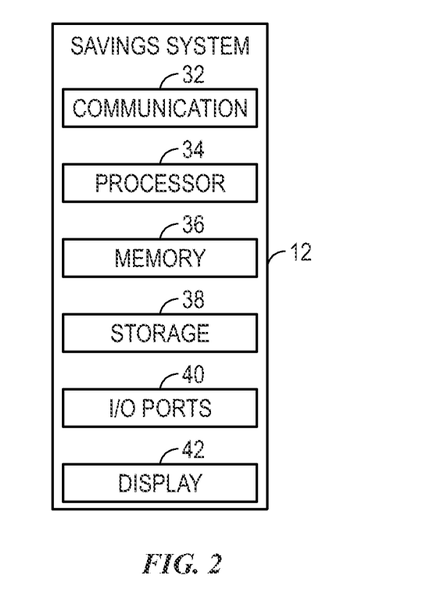
FIG. 2 a block diagram of a savings system that may be part of the underwriting monitor system of FIG. 1, in accordance with embodiments described herein.

To perform some of the actions set forth above, the savings system 12 may include certain components to facilitate these actions. FIG. 2 is a block diagram of example components within the savings system 12. It should be noted that the home assistant device 20, the wearable device 22, and the computing device 24 may include similar components for performing its respective operations. Referring now to FIG. 2, the savings system 12 may include a communication component 32, a processor 34, a memory 36, a storage 38, input/output (I/O) ports 40, a display 42, and the like. The communication component 32 may be a wireless or wired communication component that may facilitate communication between the savings system 12, the various databases described above, the home assistant device 20, the wearable device 22, the computing device 24, and any other communication-enable device.

The processor 34 may be any type of computer processor or microprocessor capable of executing computer-executable code. The processor 34 may also include multiple processors that may perform the operations described below. The memory 36 and the storage 38 may be any suitable articles of manufacture that can serve as media to store processor-executable code, data, or the like. These articles of manufacture may represent computer-readable media (e.g., any suitable form of memory or storage) that may store the processor-executable code used by the processor 34 to perform the presently disclosed techniques. The memory 36 and the storage 38 may also be used to store the loan profile and the like. The memory 36 and the storage 38 may represent non-transitory computer-readable media (e.g., any suitable form of memory or storage) that may store the processor-executable code used by the processor 34 to perform various techniques described herein. It should be noted that non-transitory merely indicates that the media is tangible and not a signal.

The I/O ports 40 may be interfaces that may couple to other peripheral components such as input devices (e.g., keyboard, mouse), sensors, input/output (I/O) modules, and the like. The display 42 may operate to depict visualizations associated with software or executable code being processed by the processor 34. In one embodiment, the display 42 may be a touch display capable of receiving inputs from a user of the savings system 12. The display 42 may be any suitable type of display, such as a liquid crystal display (LCD), plasma display, or an organic light emitting diode (OLED) display, for example. Additionally, in one embodiment, the display 42 may be provided in conjunction with a touch-sensitive mechanism (e.g., a touch screen) that may function as part of a control interface for the savings system 12.

It should be noted that the components described above with regard to the savings system 12 are exemplary components and the savings system 12 may include additional or fewer components as shown. As such, the savings system 12 should not be limited to including just the components described herein.

Figure 3:
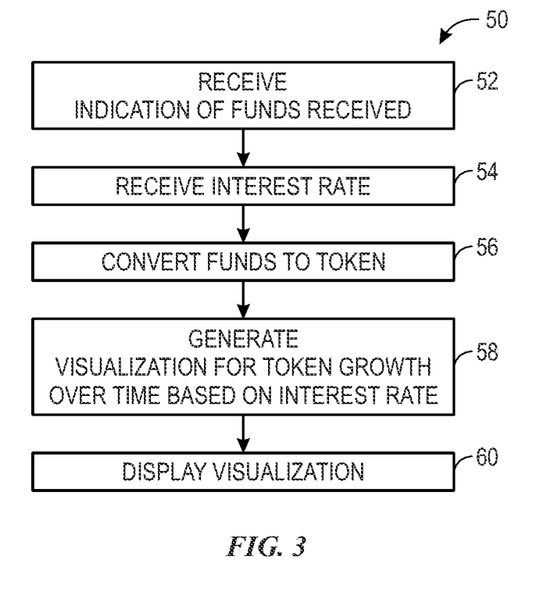
FIG. 3 illustrates a flow chart of a method for generating a visualization representative of fund growth over time, in accordance with embodiments described herein.

With the foregoing in mind, FIG. 3 illustrates a flow chart of a method 50 employed by the savings system 12 for generating visualizations representative of fund growth in accordance with embodiments herein. Although the following description of the method 50 is described in a particular order, it should be noted that the method 50 is not limited to the depicted order; and, instead, the method 50 may be performed in any suitable order. In addition, although the savings system 12 is described as performing the method 50, it should be noted that any suitable computing device may perform the method 50.

Referring now to FIG. 3, at block 52, the savings system 12 may receive an indication of funds received. The indication may be received via user input from a user. As such, the savings system 12 may be implemented using an electronic device accessible by a minor, such as a tablet device, mobile phone, or the like. The received funds may be related to funds received via gifts, allowances, performed work, or the like. In some embodiments, the indication may be received with a tag related to the source of the funds.

At block 54, the savings system 12 may receive an interest rate. The interest rate may be retrieved from the profile database 14, which may include a profile associated with the user of the savings system 12. The profile may include data that specifies a pre-defined interest rate that may be established by an adult associated with the minor child. Indeed, the pre-defined interest rate may be higher than bank interest rates to enable the user to visualize the growth of the deposited funds over time. In some embodiments, the interest rate may be determine using machine-learning algorithms based on profiles of other individuals of the same age, gender, and other characteristics of the user. That is, the machine-learning algorithms may track the behavior of the individuals having similar characteristics in light of the provided interest rates. After a threshold percentage of the individuals defer to keep the funds in the savings account, as opposed to spending it, over a period of time, the machine-learning algorithm may associate the interest rate that corresponds to the threshold percentage with the interest rate defined for the user. In some embodiments, the interest rate determined by the machine-learning algorithm may be presented via a visualization or a notification to a computing device (e.g., smart phone) associated with the supervisor or guardian account holder to allow the adult to select the determined interest rate for the related user. In some embodiments, the notification may be provided to the adult's computing device in response to a difference between the current interest rate and the machine-learning algorithm determined interest rate exceeds a threshold percentage (e.g., 5%).

It should be noted that the machine-learning algorithm may involve monitoring a number of user accounts associated with individuals of various age ranges. Over time, the machine-learning algorithm may determine trends in which certain interest rate ranges for individuals within a certain age group may defer to keeping funds in savings, as opposed to withdrawing the funds before a threshold amount of time (e.g., 1 year) expires. In this way, saving and incentive-based behavior trends of individuals in various age groups may be determined in real time. That is, individuals or adults that manage the minor individual account holders may use the machine-learning algorithm determined thresholds and values to assist them in identifying values that may cause the minor account holders to become improved savers based on the behavior of their peers.

At block 56, the savings system 12 may convert the deposited funds into tokens or virtual currency. As mentioned above, the tokens may represent an inflated value of the funds. As such, the savings system 12 may multiply the value of the deposited funds by a multiplier (e.g., 10, 100) to cause the user of the savings system 12 to attribute more value to the funds than the funds may actually be worth. Like the interest rate mentioned above, in some embodiments, the savings system 12 may employ a machine-learning algorithm to determine a suitable multiplier. That is, the machine-learning algorithm may track the saving habits of other users via the profile data stored in the profile database 14 to determine a multiplier that causes a threshold percentage of similar user to save money over a period of time. Alternatively, the profile for the user may define a multiplier, which may be pre-defined by an adult supervisor or guardian of the user.

After converting the funds into tokens or virtual currency, at block 58, the savings system 12 may generate a visualization representative of the status (e.g., balance) of the tokens for the user. The deposited funds at block 52 may be added to a previous balance to enable the user to visualize the current balance of the funds. In addition, the savings system 12 may generate visualizations that depict the potential growth of the funds based on the interest rate received at block 54. As such, the visualizations may be graphs or charts that project the increased value of the funds over time. At block 60, the savings system 12 may display the generated visualizations.

In some embodiments, the generated visualizations may include user interactive components that allow the user to access partner networks or servers to identify products that may be available for purchase using the current balance of tokens. In addition, the user interactive components may also be present on growth portions of the funds represented in the visualization. That is, user interactive components may include visualization of products that may be available for purchase via partner websites for projected values of the tokens. That is, portions of the visualization (e.g., chart, graph) that is part of a projected value in the future may receive a user selection to retrieve product data that may be purchased with the projected value of tokens. In this way, the user may realize that certain products may be available for purchase if he/she maintains the current saving and interest rate patterns.

The interest rates may be defined by other users, such as supervisor or guardian account holders. As such, the savings system 12 may track the funds stored in the user's account and automatically transfer funds from the supervisor's account into the user's account on a periodic basis based on the provided interest rate. That is, since banks and other institutions will not likely provide inflated interest rates, the savings system 12 may coordinate the payment of the interest via supervisor or guardian account holders who wish to encourage the user of the savings system 12 to save. In some embodiments, the payments may be automatically executed via a distributed ledger account or a block chain based on the conditions described above being present. In this case, the distributed ledger may receive an indication of the tokens to be transferred, as well as a token-to-dollar conversion rate associated with the tokens being transferred. As such, the distributed ledger may transfer the appropriate amount of funds to another distributed ledger.

Figure 4:
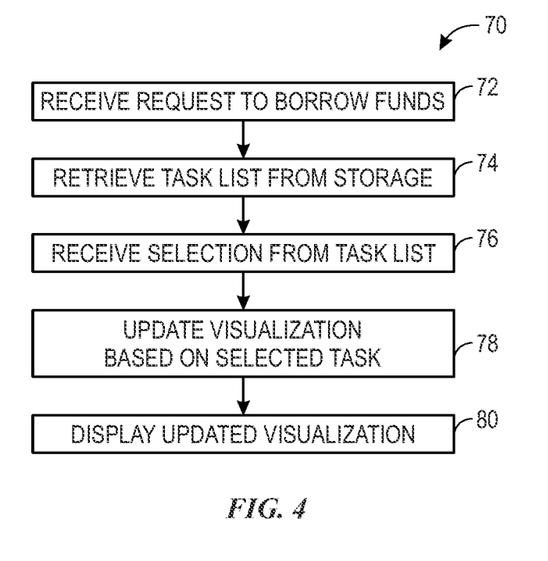
FIG. 4 illustrates a flow chart of a method for generating a visualization representative of fund growth over time in view of leveraging acceptance of a future task to be performed, in accordance with embodiments described herein.

In addition to providing the ability to track saved funds, the present embodiments described herein may enable the user of the savings system 12 to borrow funds against future tasks or chores. In this way, the present embodiments described herein may assist the user to learn about how credit is distributed and applied. With this in mind, FIG. 4 illustrates a flow chart of a method 70 for generating a visualization that includes leveraged tasks in accordance with embodiments described herein. Although the following description of the method 70 is described as being performed by the savings system 12, it should be understood that any suitable computing system may perform the method 70 described herein. In addition, it should be noted that the method 70 may be performed in any suitable order.

Referring now to FIG. 4, at block 72, the savings system 12 may receive a request to borrow funds. In some embodiments, the request may be received via an input visualization (e.g., button) presented in the visualization generated at block 58 above or the like. The input visualization may provide options for the user to request different amounts of funds along with different interest rates that will be associated with receiving the funds. In the same manner as described above, a machine-learning algorithm may be employed to determine a loan interest rate to discourage a threshold percentage of users to borrow against a future task to be performed. In other embodiments, the profile for the user may include a pre-defined loan interest rate that the supervisor or guardian account holder may specify.

In some embodiments, the savings system 12 may limit the amount in which the user may borrow based on previous activities performed by the user. That is, the savings system 12 may track the performance of the user in completing future tasks used to leverage loans to determine an amount of credit to provide the user. As the user continues to perform the future tasks within the defined time periods, the savings system 12 may increase the credit allotted to the user.

At block 74, the savings system 12 may retrieve a task list from a storage component (e.g., database) based on the amount of funds that have been requested at block 72. In some embodiments, the task lists for certain amounts of funds may be pre-defined in the profile for the user by the supervisor account holder. In other embodiments, the machine-learning algorithm may gather data regarding the lists of tasks provided to individuals having similar characteristics for various amounts of funds. The task list may include a number of chores that may be performed around the household. For example, the task list may include taking the trash out of the household, cleaning certain rooms in the household, achieving exercise goals, achieving homework goals, achieving grade goals, and the like. Different task lists may be retrieved for different amounts of funds. Indeed, a higher number of tasks may be requested in exchange for larger loan amount. After retrieving the task list, the savings system 12 may present the task list to the user via the display 42.

The user may then select one of the tasks listed in the task list via an input visualization or other suitable input received by the savings system 12 at block 76. After receiving the selection, the savings system 12 may transfer funds in the amount that corresponds to the selection to the user's account from the supervisor's account. The savings system 12 may then proceed to block 78 and generate a visualization or update the visualization described above with reference to block 58. As such, the visualization may provide an updated status of the account including the borrowed funds. In some embodiments, the visualization may include two portions that depict how the funds will progress if the user meets the task goal associated with the loan and how the funds will progress if the user does not meet the task goal. In addition, the visualization may provide another portion that indicates the user's fund growth if the user did not borrow funds. For example, a line graph depicting three lines associated with the fund growth without borrowing money, the fund growth after borrowing money and achieving the task goal, and the fund growth after borrowing money and not achieving the task goal. Indeed, the profile associated with the user may include a penalty for defaulting on the assigned task and the penalty may be reflected in the visualization. The visualization may also include user interactive components that may provide additional information regarding a breakeven point, an accrued penalty, or other information associated with different portions of the visualization. After generating or updating the visualization, the savings system 12 may display visualization via the display 42.

Figure 5:
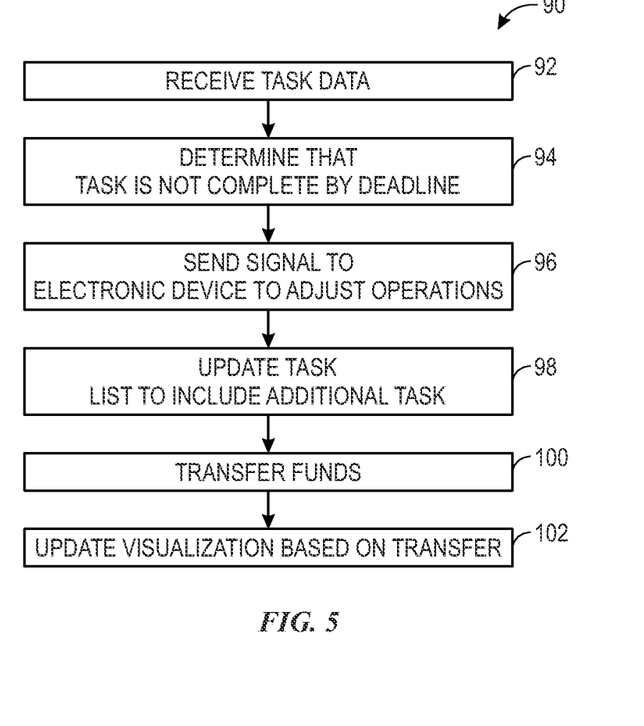
FIG. 5 illustrates a flow chart of a method for performing certain action based on whether an assigned task is performed, in accordance with embodiments described herein.

Keeping the foregoing in mind, the savings system 12 may also track the performance of the tasks using the devices described in the savings network 10 or other suitable components. Based on the tracked status of the tasks assigned to the user or receiving an indication of the completed or incomplete tasks, the savings system 12 may perform any suitable number of actions. FIG. 5, for example, illustrates a method 90 for performing certain actions based on whether the assigned tasks were completed or not. Like the methods described above in FIGS. 3 and 4, although the following description of the method 90 is described as being performed by the savings system 12, it should be understood that any suitable computing system may perform the method 90 described herein. In addition, it should be noted that the method 90 may be performed in any suitable order.

Referring now to FIG. 5, at block 92, the savings system 12 may receive task data or data indicative of the task selected by the user. The task data may include details regarding the task to be performed, a deadline in which the task performed, a method or indicator associated with the task being completed, and the like. For instance, the task data may indicate that the trash should be taken for collection two times in the upcoming week. The task data may also indicate that the task may be verified by way of an image data received via an image sensor that is part of the savings system 12, the sensors 28 that may be positioned within a sensing proximity of the trash collection site, or the like. In some embodiments, the sensors 28 may activate and acquire data when a person or object is detected within a vicinity of the sensors 28. In this way, a limited amount of image data may be associated with a completed task and a user reviewing the image data may limit his/her review to times in which the sensor was active.

At block 94, the savings system 12 may determine that the assigned task is not complete after the deadline expired. In some embodiments, the savings system 12 may not have received an indication of the completed task via specified manner described in the task data. Alternatively, the savings system 12 may use the sensors 28 to determine whether the assigned task has been completed. That is, the sensors 28 may periodically send data (e.g., image data) related to the assigned task (e.g., taking trash to curb for collection). After the deadline expires, the sensors 28 may continue to send image data to the savings system 12. The savings system 12 may use image recognition to determine whether the task was complete. For example, image data related to trash being left for collection may be stored in a database or other suitable storage component. As such, the savings system 12 may compare the image data received after the deadline to other image data representative of the trash being left for collection to determine whether the task has been performed.

In addition to image data, other sensor data may be used to determine whether a task is performed. For instance, the home assistant device 20 may record audio (e.g., vacuuming) of a portion of the household to determine whether a task is performed. In another embodiment, the wearable device 22 may track the movement, location, heart rate, and other properties of the user to determine whether an assigned task is performed.

In any case, after determining that the assigned task is not complete, the savings system 12 may proceed to block 96 and send one or more signals to one or more of the electronic devices 26 to adjust respective operations of the electronic devices 26. For instance, the savings system 12 may send a signal to a tablet device that may cause the tablet device to disable applications from being accessed by the user. In another example, the savings system 12 may send a signal to a headphone set to disable usage for the user. In yet another embodiment, the savings system 12 may send a signal to any suitable electronic device 26 to disable any interaction by the user.

In some embodiments, after determining that the assigned task was not completed, the savings system 12 may proceed to block 98 and update the task list to include additional items. As such, the user may pay interest on the loan by way of additional tasks. Here, the savings system 12 may again monitor whether the user performs the task as described above.

At block 100, the savings system 12 may transfer funds from the user's account to the supervisor's account as a penalty for not completing the task within the specified time period. As mentioned above, the penalty charge may be specified with the profile for the user in the profile database 14 or the like.

At block 102, the savings system 12 may generate or update a visualization as described above with reference to block 58 of the method 50. In this way, the savings system 12 may present the updated visualization, such that the user may become aware of the effects not performing the task in the specified amount of time.

The present embodiments described herein may be used to help incentivize individuals to save money and avoid defaulting on credit in an environment that may not affect a credit score or the like. That is, parents may use the embodiments described herein to provide real scenarios that children or other minors may use to learn the advantages of saving money and the disadvantages from borrowing using credit. In addition, the present embodiments may assist children to better understand and appreciate how to use credit to their benefits, while emphasizing the existence of penalties for default.

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A system, comprising:
a processor configured to:
receive an indication of a first amount of funds deposited into an account;
convert the first amount of funds into a number of tokens using a multiplier;
generate a visualization representative of a growth rate of the number of tokens over a period of time based on an interest rate, wherein the interest rate is defined by a user with supervisor authority over the account;
display the visualization via an electronic display;
receive a request to borrow a second amount of funds;
retrieve a task list associated with the second amount of funds;
receive a selection of a task from the task list;
determine whether the task is completed; and
in response to determining that the task is not complete:
transfer a portion of the first amount of funds to an additional account associated with the user; and
transmit a signal to an electronic device associated with the user to disable one or more applications of the electronic device from being accessed by the user.

2. The system of claim 1, wherein the processor is configured to determine that the task is complete based on image data acquired after the task was completed.

3. The system of claim 2, wherein the image data is acquired via one or more sensors positioned to acquire data associated with an object related to the task.

4. The system of claim 1, wherein the processor is configured to send image data associated with the task after a deadline associated with the task expires.

5. The system of claim 1, wherein the processor is configured to receive a user input via a portion of the visualization, wherein the portion of the visualization corresponds to a projected value of the number of tokens.

6. The system of claim 5, wherein the user input is configured to cause the processor to access a website comprising one or more products for purchase using the projected value of the number of tokens.

7. The system of claim 6, wherein the user input is configured to cause the processor to send metadata comprising the multiplier to a server system configured to modify the website.

8. The system of claim 7, wherein the server system is configured to modify one or more values for the one or more products based on the multiplier.

9. The system of claim 1, wherein the processor is configured to periodically transfer an additional amount of funds from the additional account associated with the user to the account in response to the first amount of funds remaining in the account after the period of time.

10. A method, comprising:
receiving, via a processor, an indication of a first amount of funds deposited into an account;
converting, via the processor, the first amount of funds into a number of tokens using a multiplier, wherein the multiplier is determined based on a user profile of a user associated with the account;
generating, via the processor, a visualization representative of a growth rate of the number of tokens over a period of based on an interest rate, wherein the interest rate is defined by an additional user with supervisor authority over the account;
displaying, via the processor, the visualization via an electronic display;
receiving, via the processor, a request to borrow a second amount of funds;
retrieving, via the processor, a task list associated with the second amount of funds;
receiving, via the processor, a selection of a task from the task list;
determining via the processor, that the task is not completed; and
in response to determining that the task is not complete:
transferring, via the processor, a portion of the first amount of funds to an additional account associated with the user; and
transmitting, via the processor, a signal to an electronic device associated with the user to disable one or more applications of the electronic device from being accessed by the user.

11. The method of claim 10, comprising:
receiving task data associated with performing the task;
detecting whether the task is performed before a deadline; and
transferring a third amount of funds from the additional account in response to the task being performed.

12. The method of claim 11, comprising adding an additional task to the task list of the task data in response to detecting that the task is not performed before the deadline.

13. The method of claim 11, wherein the task data comprises one or more details associated with the task, a list of tasks to be performed, the deadline, an indicator for indicating that the task is completed, or any combination thereof.

14. The method of claim 13, wherein the indicator comprises image data associated with the task.

15. The method of claim 11, comprising periodically transferring, via the processor, an additional amount of funds from the additional account associated with the user to the account in response to the first amount of funds remaining in the account after a period of time.

16. A non-transitory computer-readable medium comprising computer-executable instructions that, when executed by a processor, are configured to cause the processor to perform operations comprising:
receiving an indication of a first amount of funds deposited into an account;
converting the first amount of funds into a number of tokens using a multiplier, wherein the multiplier is determined based on a user profile of a user associated with the account;
generating a visualization representative of a growth rate of the number of tokens over a period of based on an interest rate, wherein the interest rate is defined by an additional user with supervisor authority over the account;
displaying the visualization via an electronic display;
receiving a request to borrow a second amount of funds;
retrieving a task list associated with the second amount of funds;
receiving a selection of a task from the task list;
determining whether the task is completed; and
in response to determining that the task is not complete:
transferring a portion of the first amount of funds to an additional account associated with the user; and
transmitting a signal to an electronic device associated with the user to disable one or more applications of the electronic device from being accessed by the user.

17. The non-transitory computer-readable medium of claim 16, wherein the multiplier is determine based on the user profile and a machine learning algorithm configured to determine a multiplier value associated with a plurality of users.

18. The non-transitory computer-readable medium of claim 17, wherein the machine learning algorithm is configured to determine the interest rate.

19. The non-transitory computer-readable medium of claim 17, wherein the machine learning algorithm is configured to track a plurality of behaviors of the plurality of users with respect to the interest rate and a savings amount.

20. The non-transitory computer-readable medium of claim 16, the operations comprising periodically transferring an additional amount of funds from the additional account associated with the user to the account in response to the first amount of funds remaining in the account after the period of time.

* * * * *